United States Patent [19]

Clark

[11] 4,132,238
[45] Jan. 2, 1979

[54] AUTOMATIC SEPARATOR VALVE

[76] Inventor: Earl A. Clark, 1143 Manchester Ave., Norfolk, Va. 23508

[21] Appl. No.: 792,447

[22] Filed: Apr. 29, 1977

[51] Int. Cl.² .................................................. F16K 31/22
[52] U.S. Cl. ................................... 137/172; 137/192; 137/433
[58] Field of Search ............... 137/172, 399, 433, 192

[56] References Cited

U.S. PATENT DOCUMENTS

| | | | |
|---|---|---|---|
| 1,732,222 | 10/1929 | Cantrell | 137/433 |
| 1,750,489 | 3/1930 | Pippin | 137/399 |
| 1,995,742 | 3/1935 | Linnmann | 137/172 X |
| 2,170,247 | 8/1939 | Farmbert | 137/172 X |
| 2,906,285 | 9/1959 | Bosten | 137/399 |
| 2,962,042 | 11/1960 | Snider | 137/433 X |
| 3,146,788 | 9/1964 | Mahlstedt | 137/399 |

*Primary Examiner*—Alan Cohan

[57] ABSTRACT

A mechanical valve used to stop unwanted discharge of liquids less dense than water, principally oil, which may be present in waste water flows. The valve is closed by sinking of a float less dense than water but more dense than the liquid whose discharge is to be stopped. The float is surrounded by a housing. Variations in the location of holes in the housing determine the depth of liquid which is required before the valve will close. Simple glass or other containers may be converted to serve as grease traps by installing the valve which has its discharge outlet above the valve orifice.

10 Claims, 4 Drawing Figures

AUTOMATIC SEPARATOR VALVE

BACKGROUND OF THE INVENTION

This invention relates to a means for the prevention of the accidental discharge of oils and other liquid contaminents into sewage systems, streams and other bodies of water, and, to the control of processes requiring regulation of the flow of liquids with differing specific gravities.

Although this invention has application in the prevention of accidental spills, discharges and accidental mixing of many liquids, for simplicity, its application in the prevention of oil pollution will be described.

As is generally known, most oils are immiscible with water and, due to the lower density of the former, tend to rise to the surface of the water.

It has long been the practice to install grease traps, or oil-water separators, in waste water lines which may be contaminated with oil.

In general these devices provide a containment in which the oil and water mixtures are permitted a period of quiescence during which the lighter density oil rises to the surface of the water where it is contained by baffles or walls. The heavier density water is drained from the lower portion of the containment.

When the grease trap becomes full with oil it must be pumped out or the oil removed by some other means. If the oil is not removed, or, if due to an accident, the containment is flooded with oil, then the oil will start flowing out through the water drain.

To reduce the probability of water pollution due to oil spills and discharges of oil in industrial waste water effluents, grease traps, oil-water separators, dikes, holding ponds and other containment devices are installed in great numbers, frequently at the direction of government agencies concerned with environmental protection. In all of these containments it is necessary to provide for drainage of rain or other waste water. If the containment becomes filled with oil while the water drain valve is open then the oil will be discharged, causing pollution.

This invention provides a means to automatically close water drains in such containments to prevent the accidental discharge of oil or other liquid contaminents by utilizing the lower density of the oil to affect a float which in turn seals off the water drain.

OBJECT OF THE INVENTION

It is an object of this invention to provide a mechanical, fully automatic Separator Valve that will commence its closing function at the first instance that oil or other liquid less dense than water is in the presence of the Valve closing means.

It is another object of this invention to provide a mechanical, fully automatic Separator Valve that will not commence its closing function until a specific depth of oil or other liquid less dense than water is in the presence of the Valve closing means.

It is a further object of this invention to provide fully automatic mechanical Separator Valve as described above which may readily be installed in all manner of chambers, pits, ditches, and the like thereby converting such containment devices to function as grease or oil traps or to prevent the accidental discharge of oil or other liquid lighter than water therefrom.

These and other objects and advantages of this invention will become better understood to those skilled in the art by reference to the following detailed description and the accompanying drawings.

DESCRIPTION OF THE INVENTION

This invention embodies a mechanical valve assembly which may be installed in grease traps, separators, tanks or other containments to prevent the accidental discharge of oil or other liquid contaminents with a density less than the density of water.

Figure 1:
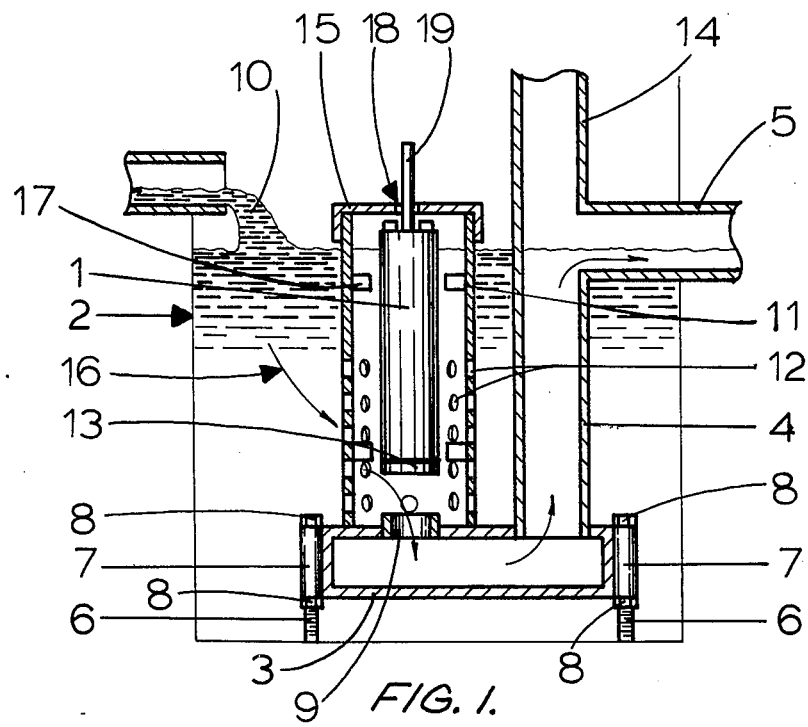
FIG. 1 illustrates an embodiment of the invention.

A preferred embodiment of this invention is illustrated in FIG. 1.

In this embodiment the details of the construction of the Separator Valve are such that the valve float 1 will not commence its closing function until a specific depth of oil has accumulated in containment 2, as described in the following paragraphs.

The Separator Valve is installed in containment 2 in a manner such that conduit 3 is horizontal and riser 4, being essentially a vertical hollow pipe, is connected to the discharge outlet pipe 5 by a standard tee pipe fitting connection. Conduit 3 is fixed at a level position and located by means of a set of adjustable rods 6 which are threaded and secured in tubes 7 by nuts 8. Rods 6 may lift conduit 3 and consequently the entire device, to a position above the floor of containment 2 avoiding fouling by contact with settled grit and sludge.

Minimum liquid level in containment 2 is determined by the level of the discharge outlet pipe 5, which is at a level such that float 1 is buoyed high enough to allow free passage of water through orifice 9.

Waste water 10 enters containment 2 from an external source. Sand, sludge and other components heavier than water, settle to the bottom of containment 2. Oil, being lighter than water, rises to the top and is prevented from entering housing 11 by the solid upper section of housing 11.

Oil-free water flows through perforations 12 in the lower portion of housing 11, through orifice 9, conduit 3, up riser 4, and is discharged through the horizontal outlet pipe 5.

Float 1, comprised of a watertight elongated body, and having a specific gravity of less than 1.00, and greater than the specific gravity of the oil or other lighter than water fluid, is contained in housing 11.

When housing 11 contains water only, float 1 rises so that valve disc 13 is clear of orifice 9, permitting water to flow through orifice 9, conduit 3, up riser 4, discharging through outlet pipe 5. As is common practice with waste water drains, outlet pipe 5 is vented, pipe 14, to prevent siphoning. Vertical movement of float 1 is limited by cover 15.

Oil entering containment 2 rises to the surface while the water, being more dense than the oil, flows through the perforations in housing 11, passes through open orifice 9, as shown by arrows 16. Oil is prevented from entering housing 11 by the solid upper portion of housing 11.

As the amount of accumulated oil at the surface within containment 2 increases, the depth of the oil-water interface is lowered until it eventually reaches the level of perforations 12 in the lower portion of housing 11. Any further increase in the amount of oil entering containment 2 will result in the introduction of oil into housing 11 via perforations 12. Oil entering housing 11 lowers the specific gravity of the fluid therein, causing float 1 to lose buoyancy, and, subsequently, to sink.

Figure 2:
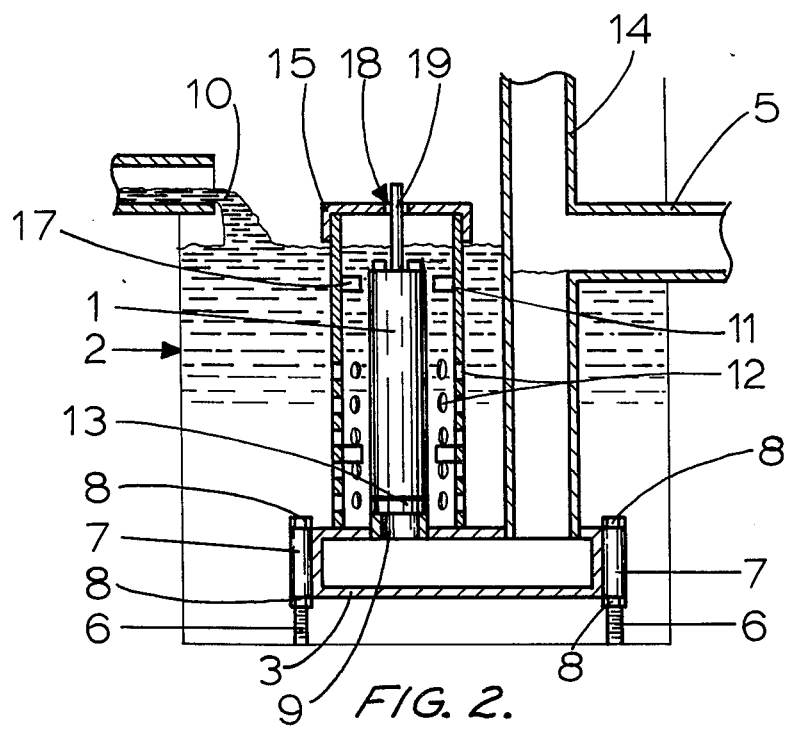
FIG. 2 shows the device in another condition.

Float 1 is restricted in its lateral movements by a series of projections 17 extending from housing 11 which maintain float 1 in a position directly above orifice 9. When the specific gravity of the fluid within housing 11 is less than the specific gravity of float 1, float 1 will sink and come to rest upon orifice 9 as shown in FIG. 2, blocking flow and causing discharge to cease.

If oil accumulates in containment 2 beyond the depth necessary to sink float 1, pressure on valve disk 13 will increase proportional to the oil depth, producing a more secure seal. This buildup of pressure will increase until the oil water interface is at the level of valve disc 13, resting over orifice 9.

If the level of water in containment 2 is raised after discharge has been stopped due to float 1 sinking and blocking orifice 9, the interface between the oil and the water will rise. If the water level rises far enough, the oil will be discharged out of housing 11 through opening 18 in cover 15, and the valve will open allowing the water to be discharged.

Rod 19 is attached directly to float 1 by means of a threaded connection and protrudes through opening 18. Rod 19, being attached directly to float 1, is used as a signalling device, which gives accurate information regarding whether the valve float is in an open or closed position.

Those using this invention may also wish to install a switch or other electrical or mechanical device in position to be actuated by rod 19 to notify them in event the valve should close.

Figure 3:
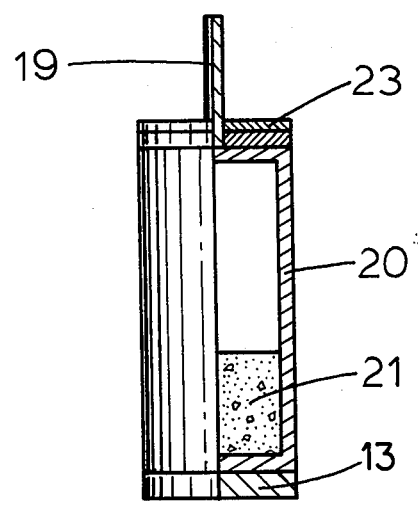
FIG. 3 shows a detail of the device of FIG. 1.

A more complete description of the component parts of the Separator Valve follows. FIG. 3 illustrates the construction of float 1, which is comprised of a watertight hollow body 20, ballast 21, rod 19, valve disc 13 and weights 23.

Body 20 is elongated vertically. Ballast 21 is of high density material such as cement and is placed in the lower portion of the body 20 causing the center of gravity of float 1 to be near its lower end, such that float 1 is vertically stable when supported by buoyant forces.

Sufficient ballast 21 is used to make the specific gravity of float 1 less than 1.00 but more than the specific gravity of the oil. It has been found practical to ballast the float to a specific gravity of 0.95 if the Separator Valve is to be used with petroleum based oils. However, the amount of ballast may be varied to obtain a float with a higher or lower specific gravity, depending on the character of the fluid and the sensitivity required.

Once ballast 21 has been installed and body 20 sealed watertight, weights 23 provide a means to increase the specific gravity of float 1, thereby increasing its sensitivity. Weights 23 can be of any suitable high density material. Sheet steel of various gauges, with a central hole slightly larger than rod 19 are suitable. Weights 23 are placed on the top of float 1 being constrained by rod 19 as shown in FIG. 1. This arrangement permits simple and accurate adjustment of the float sensitivity after installation of the Valve.

The total buoyant forces acting on float 1 is the resultant of the buoyancy contributed by the water and by the layer of oil acting on float 1. Since the oil has a specific gravity less than water, the thicker the oil layer the less the buoyant force. When the combined buoyant force of the water and the oil is less than the weight of float 1, it will sink, closing the orifice 9. The sinking force continues to increase as the layer of oil increases in depth, until the oil layer depth equals the length of body 20. In this manner the elongated float body provides means to develop sufficient sinking force to seal orifice 9, even when used with oils with specific gravity less than but approaching 1.00.

Rod 19 is attached to float 1 and extends up through opening 18 in cover 15. Rod 19 is used to provide visual indication of the vertical position of float 1. Rod 19 may also be used to actuate a switch or other device to signal the vertical position of float 1.

Float 1 is loosely constrained over the orifice 9, by projections 17, attached to housing 11. Since float 1 floats in the vertical position, it is only necessary for projections 17 to constrain the float against horizontal movement, such that the valve disc 22 will completely cover orifice 9 when float 1 sinks. In this manner, close clearance which could cause sticking of the float are avoided.

Valve disc 13, on the lower end of float 1, is in a plane perpendicular to the vertical axis of the float and is so constructed as to form a watertight seal when float 1 sinks and valve disc 13 covers orifice 9. The Valve disc may be made of soft, pliable, closed cell gasket material or of other materials and configurations as is common practice in the manufacture of valves.

Figure 4:
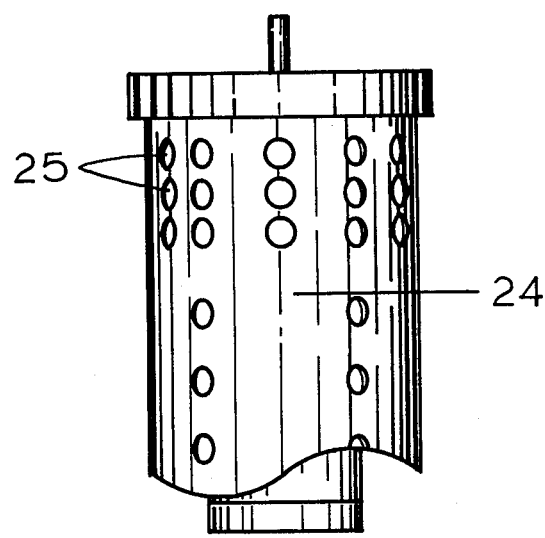
FIG. 4 illustrates a detail of another embodiment of the invention.

When the purpose of the Separator Valve is to prevent the accidental discharge of oil from containments in which oil does not normally accumulate, housing 11 may be replaced with housing 24, illustrated in FIG. 4, which is of the same general shape and construction as housing 11, except that it is perforated in its uppersection as well as in the lower section.

By means of the perforations 25 in the upper portion of housing 24, any oil on the surface of the water is permitted to enter housing 24, affecting the buoyancy of float 1, which will then commence its closing function.

In the preferred construction of housing 24, the number and size of perforations 25 in the upper section of housing 24 as compared to the number and size in the lower section are such as to encourage fluid near the surface to flow into housing 24, thereby causing any oil on the surface to quickly affect the buoyancy of float 1.

While the Separator Valve described herein is a separate unit, it is within the scope of the invention to make the device an integral part of a grease trap or oil separator, in which case the conduit 3, riser 4, and pipe 5 may be formed as an integral part of the structure of the chamber.

And, while this invention shows the use of the Separator Valve in an open chamber or tank, it is within the scope of the invention to include the separator valve inside a closed tank or chamber wherein it would function as described herein.

What is claimed as new and desired to be protected by Letters Patent of the United States is:

1. An automatic separator valve adapted to be installed in a containment into which a mixture of water and a fluid less dense than water flows through an inlet, said automatic separator valve being operable to separate said water from said mixture for subsequent discharge from said containment substantially free of said fluid less dense than water, comprising:

a conduit operationally positionable substantially adjacent the lowermost extremity of said containment provided with an upwardly opening orifice adapted to be closed by valve means, said conduit further being in fluid communication with a containment water discharge outlet;

a casing having a lower extremity interconnected with said conduit and surrounding said upwardly opening orifice, a lower portion of the height of said casing being perforated to permit the flow of fluid thereinto from exteriorly thereof;

said containment water discharge outlet being substantially at the level of the upper extremity of an upper portion of the height of said casing and said containment inlet being at least as elevated as said containment water discharge outlet; and an operationally vertically movable float positioned within said casing, said float carrying a valve disc situated beneath the lowermost extremity thereof adapted to close said upwardly opening orifice when said float is at the lowermost extremity of the range of vertical movement thereof to prevent the flow of fluid into said conduit and said containment water discharge outlet.

2. The automatic separator valve according to claim 1, wherein the specific gravity of said float is less than 1.00 but greater than the specific gravity of said fluid less dense than water included in said mixture flowing into said containment, said float being vertically elongated and so ballasted that the center of gravity thereof is nearer the lower extremity thereof than the upper extremity thereof.

3. The automatic separator valve according to claim 2, wherein said float is loosely constrained against horizontal movement within said casing, and wherein the buoyancy of said float decreases proportionately to the length thereof immersed in said fluid less dense than water.

4. The automatic separator valve according to claim 2, wherein said float is adapted to carry weights for increasing the sensitivity thereof which are operationally positionable thereon while said valve remains in service and which are thereafter readily visually observable.

5. The automatic separator valve according to claim 2, wherein a rod attached to said float extends upwardly therefrom to provide a visual indication of the vertical position of said float.

6. The automatic separator valve according to claim 1, wherein said upper portion of the height of said casing is perforated to permit the flow of fluid thereinto from exteriorly thereof at a rate greater than fluid may flow into said perforated lower portion of the height of said casing.

7. The automatic separator valve according to claim 6, wherein the specific gravity of said float is less than 1.00 but greater than the specific gravity of said fluid less dense than water included in said mixture flowing into said containment, said float being vertically elongated and so ballasted that the center of gravity thereof is nearer the lower extremity thereof than the upper extremity thereof.

8. The automatic separator valve according to claim 7, wherein said float is loosely constrained against horizontal movement within said casing, and wherein the buoyancy of said float decreases proportionately to the length thereof immersed in said fluid less dense than water.

9. The automatic separator valve according to claim 7, wherein said float is adapted to carry weights for increasing the sensitivity thereof which are operationally positionable thereon while said valve remains in service and which are thereafter readily visually observable.

10. The automatic separator valve according to claim 7, wherein a rod attached to said float extends upwardly therefrom to provide a visual indication of the vertical position of said float.

* * * * *